United States Patent [19]

Opheij

[11] Patent Number: 4,810,073

[45] Date of Patent: Mar. 7, 1989

[54] OPTICAL SCANNING APPARATUS

[75] Inventor: Willem G. Opheij, Eindhoven, Netherlands

[73] Assignee: U.S. Philips Corporation, New York, N.Y.

[21] Appl. No.: 15,455

[22] Filed: Feb. 17, 1987

[30] Foreign Application Priority Data

Nov. 27, 1986 [NL] Netherlands ........................ 8603010

[51] Int. Cl.$^4$ ............................................. G02B 13/18
[52] U.S. Cl. ................................................... 350/432
[58] Field of Search ........................................ 350/432

[56] References Cited

U.S. PATENT DOCUMENTS 2,759,393 8/1956 McLeod .............................. 350/432
4,668,056 5/1987 Braat et al. ......................... 350/432

Primary Examiner—John K. Corbin
Assistant Examiner—Rebecca D. Gass
Attorney, Agent, or Firm—Algy Tamoshunas

[57] ABSTRACT

An optical apparatus is described for scanning an optical record carrier comprising a radiation source supplying a scanning beam, a reflector for directing the scanning beam to the record carrier and an objective lens for focussing the beam to a scanning spot on the information surface. The mounting height of the apparatus is considerably reduced by integrating the objective lens and the reflector in a single reflector-objective element.

10 Claims, 1 Drawing Sheet

OPTICAL SCANNING APPARATUS

BACKGROUND OF THE INVENTION

The invention relates to an apparatus for scanning a radiation-reflective information surface of a record carrier with optical radiation. Such an apparatus comprises a radiation source for supplying a scanning beam, a reflector arranged in the path of the beam for reflecting the scanning beam to the record carrier and an objective lens for focussing the scanning beam to a scanning spot on the information surface.

"Scanning the information surface" as used herein is to be understood to mean both scanning for reading a prerecorded information surface and scanning for recording information in such a surface with a radiation beam which is modulated in intensity in accordance with the information to be recorded.

An apparatus of this type intended for reading an optical record carrier which is provided with an information structure located on an information surface and arranged in information tracks is known from "Philips' Technical Review", Vol. 33, No. 7 (1973) pages 186–189. In the known apparatus, a reflector is arranged in the path of the scanning beam whose central ray extends in a horizontal direction. The reflector reflects the scanning beam in such a manner that the central ray of the reflected beam extends at an angle of 90° to that of the beam incident on the reflector. The record carrier is located above the radiation source and the reflector and the central ray of the scanning beam is perpendicular to the record carrier. The scanning beam is focussed on the information surface by an objective lens which is arranged between the reflector and the record carrier. The reflector is pivotably mounted and is used to correct the position of the scanning spot in the radial direction of the disc-shaped record carrier so that the spot keeps following an information track to be scanned.

More recent developments, particularly in apparatus intended for reading an optical audio record, which are referred to as CD players, have resulted in a compact and elongated read unit which has been described, for example in "Philips' Technical Review", Vol. 40 (1982) no. 6, pages 151–155. This read unit, also referred to as light pen, comprises the radiation source, all the required optical components and the radiation-sensitive detection system and is mounted on a pivotal arm by means of which the radial position of the scanning spot on the information surface can be adjusted. The light pen has a relatively small height, for example 45 mm and is successfully used in present-day CD players designed for home use.

For special uses, for example in portable players or in players to be mounted in motorcars, it is desirable to reduce the mounting height of the optical scanning unit to a considerable extent. To this end, the light pen may be replaced by a scanning unit in which the greater part of the radiation path extends horizontally and in which use is made of a reflector in order to reflect the scanning beam in the vertical direction to the record carrier. However space must still be reserved for the objective lens so that a limit is imposed on the reduction of the distance between the reflector and the record carrier.

SUMMARY OF THE INVENTION

The object of the present invention has is to provide a scanning apparatus for optical record carriers with an extremely small mounting height.

The apparatus according to the invention is characterized in that the objective lens and the reflector are integrated in one reflector-objective element comprising a first refractive surface facing the radiation source, a second refractive surface facing the record carrier and a radiation-reflective surface arranged between the first and the second refractive surface, at least one of the refractive surfaces being convex and aspherical.

In this arrangement, the objective lens is now located in the space which was reserved for the reflector so that a separate space for the objective lens in the vertical radiation path is no longer required. The height of the optical scanning unit is now determined by the sum of the height of the reflector-objective element and the working distance of the objective lens, that is to say the distance between the lens surface at the image end of the objective lens and the image plane of the objective lens. This working distance is small for the type of objective lenses used in this case, for example several millimeters.

The invention makes optimum use of the fact that a high quality objective lens which must form a very small image with a diffraction-limited quality has been successfully designed in recent years. Such an objective lens has only one lens element with one or two aspherical refractive surfaces. The invention is based on the recognition that this single objective lens is eminently suitable to be integrated with a reflective element without affecting the imaging quality.

It is to be noted that it is known per se to integrate a lens element with a reflector for other purposes. Reference may be made by way of example to U.S. Pat. No. 3,850,520 describing a prism having a first which constitutes the entrance surface for the radiation and a second surface which is reflective and extends at an angle of 45° to the entrance surface. A third surface of the prism, arranged in the path of the relected radiation, has a convex surface and acts as a lens element. Although the U.S. Pat. No. 3,850,520 states that the prism element is compact, its object is to increase the geometrical distance between a radiation source and the point where the radiation emitted by that source is focussed so that a film can be arranged between the source and the focussing point.

Besides it is known, for example from U.S. Pat. No. 4,411,500, to integrate a prism having one or two lens elements in scanning apparatus for optical record carriers. However, this prism has a semireflective surface instead of a fully reflective surface and is intended to separate the beam coming from the record carrier from the beam emitted by the radiation source. The lens, which is integrated with this prism, is a plano-convex collimator lens which, while maintaining its original shape, is cemented onto the prism or is manufactured, from the same material simultaneously with the prism as one element.

The integration of a high quality objective lens with a reflector for use in an optical scanning apparatus for the purpose of reducing the mounting height is not disclosed in aforementioned patents.

A first embodiment of the scanning apparatus in which a collimator lens is arranged between the radiation source and the reflector-objective element is further characterized in that one of the refractive surfaces is convex and aspherical and the other refractive surface is plane.

In this case use is made of the fact disclosed in European patent application No. 0,146,178 that when using a collimated beam, a diffraction-limited scanning spot can be obtained with a single objective lens having only one convex and aspherical surface, whereas the other refractive surface is plane. This plane surface is preferably arranged on the side of the record carrier, because this surface is least vulnerable.

A second embodiment of the scanning apparatus in which a diverging beam is incident on the reflector-objective element is characterized in that both the first and the second refractive surfaces are convex.

These embodiments are preferably further characterized in that the reflector-objective element has a generating a hemispherical shape whose plane surface is reflective and whose convex surface comprises two parts at least one of which is aspherical.

The reflector-objective element may consist entirely of glass. The optical properties of this element are then substantially independent of variations in ambient parameters such as temperature and humidity. However, it may be a cumbersome process to provide aspherical surfaces on glass. If the reflector-objective element is made entirely of a transparent synthetic material, the aspherical surfaces can be provided more easily by using aspherical moulds during manufacture, for example by pressing or moulding. The optical properties of such an element are, however, dependent on variations in ambient parameters.

A reflector-objective element whose properties are optimized for ease of manufacturing and stability has a glass substrate. The aspherical surface of the element is formed by an aspherical outer surface of a layer of a transparent synthetic material which is provided on the substrate.

The material of this layer is preferably a polymer cured by ultraviolet radiation. An example of such a polymer is polymethylmethacrylate (PMMA).

BRIEF DESCRIPTION OF THE DRAWINGS

The invention will now be described in greater detail with reference to the accompanying drawing in which.

DESCRIPTION OF THE PREFERRED EMBODIMENTS

Figure 1:
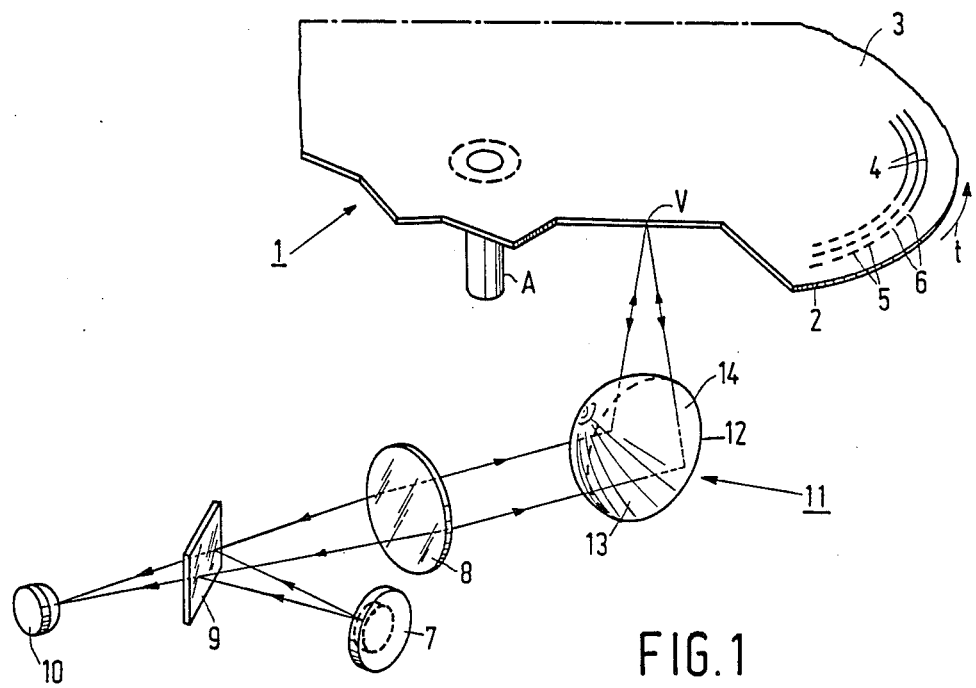
FIG. 1 is a diagrammatic perspective view of an embodiment of an optical scanning apparatus having an integrated reflector-objective element and FIGS. 2 and 3 show different embodiments of a reflector-objective element in cross-sections.

FIG. 1 shows a portion of a disc-shaped record carrier 1. The information structure comprises information tracks 4 located in an information surface 3. The tracks are formed by a large number of information areas 5 which alternate in the track direction t with intermediate areas 6. The information structure is preferably located on the upper side of the record carrier and is read by a scanning beam b passing through the substrate 2. The scanning beam is supplied by a radiation source 7, for example a semiconductor diode laser such as an AlGaAs laser.

The scanning beam b is focussed by an objective lens 11 to a scanning spot V in the information surface. A collimator lens 8 may be arranged between this objective lens and the diode laser. Lens 8 converts the diverging beam originating from the diode laser into a parallel beam having a cross-section such that the pupil of the objective lens is adequately filled so that the scanning spot V is diffraction-limited and, thus, has a limited diameter. The read beam is reflected by the information surface. As the record carrier is rotated by the drive spindle A, the reflected beam is modulated in accordance with the information which is stored in a track 4 being read.

A beam splitter 9, for example in the form of a semitransparent mirror, is arranged in the radiation path. The beam splitter reflects the beam b originating from the radiation source 7 to the objective lens and passes the modulated beam coming from the record carrier to a radiation-sensitive detection system 10. The detection system supplies an electrical signal which is modulated in accordance with the information which is stored in a track being read. The detection system may also supply signals which represent positional errors of the radiation spot with respect to a track to be read and/or focus errors as described in the above-cited "Philips' Technical Review", Vol. 40, no. 6, pages 151–155.

As is known, a polarisation-sensitive splitting prism may be used as a beam splitter instead of a semitransparent mirror. A birefringent plate must then be arranged in the radiation path between the beam splitter and the objective lens, which plate ensures that the direction of polarisation of the beam returning from the record carrier is rotated through 90° with respect to the direction of polarisation of the beam emitted by the source.

The central ray of the beam b which is emitted by the source 7, is reflected by the element 9 and passes through the element 8, is located in a horizontal plane. In this plane there is also located the central ray of the returning beam which has passed the collimator lens 8 and is passed by the beam splitter 9. A reflector 12 reflecting the scanning beam at an angle of approximately 90° in the direction of the record carrier is arranged in the radiation path between the collimator lens and the record carrier. As a result of this construction, the scanning apparatus has a mounting height which is considerably smaller than that of known scanning systems in which the elements 7, 8 and 9 and the objective lens are aligned in a direction normal to the record carrier.

According to the invention, the mounting height is reduced still further by integrating the objective lens with, for brevity the reflector in one element which is referred to as reflector-objective element. This element is denoted by the reference numeral 11 in FIG. 1. In addition to the reflective surface 12, it has first and second radiation-refractive surfaces 13 and 14 which constitute the entrance and exit surfaces, respectively, of the objective lens. Since the objective lens is now accommodated in the space which must be reserved for the reflector anyway, a separate space for the objective lens between the reflector and the record carrier is no longer necessary. The distance between the reflector-objective element 11 and the record carrier can now be made very small. This distance is determined by the working distance of the objective lens, that is to say the distance between the image plane of the objective lens and its surface 14.

As shown in FIG. 1, the two surfaces 13 and 14 may be convex so that both of them supply a portion of the optical power of the objective lens. If the beam incident on the surface 13 is a collimated beam (hence if a collimator lens is present between the radiation source 7 and the reflector-objective element 11) one of the surfaces 13 and 14 may be plane and only the other surface is convex and aspherical. As described in European patent application No. 0,146,178, an objective lens having one convex and one plane surface can form an acceptable scanning spot from a collimated beam, provided that the convex surface is aspherical.

Figure 2:
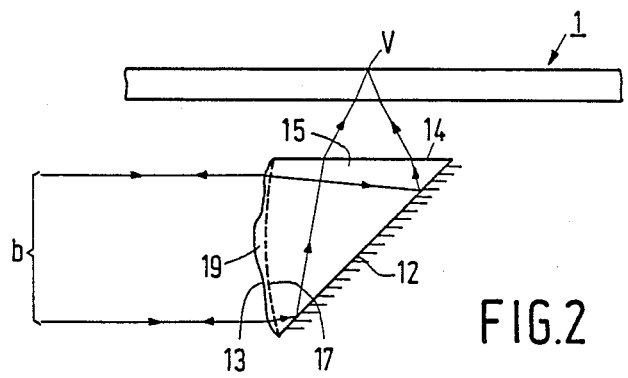

FIG. 2 shows an embodiment of a reflector objective element with a plane surface 14 and an aspherical convex surface 13 in cross-section. As shown in FIG. 2, the outwardly facing surface 14 of the objective element, i.e. the surface which may get dirty and must be cleaned and may therefore be touched by the user, is preferably in the form of a plane surface because such a surface is least vulnerable.

Figure 3:
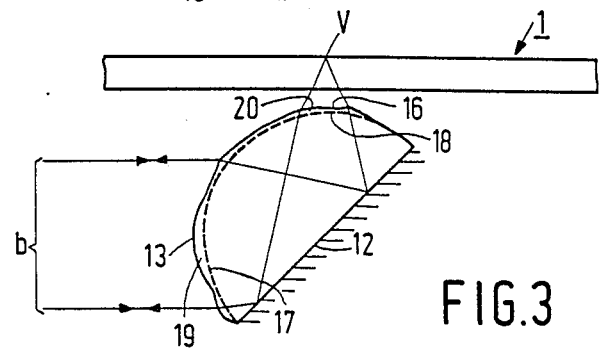

If the beam entering the reflector-objective element is a diverging beam, the two surfaces of the objective element must be convex and at least one of these surfaces must be aspherical. FIG. 3 shows a reflector-objective element with two convex and aspherical surfaces in cross-section. This embodiment is also preferred if the incoming beam is collimated.

If the beam which is incident on the reflector-objective element is collimated, this objective element may alternatively have one concave and one convex surface provided that the convex surface has a sufficiently large refraction so that the objective element is convergent.

As already noted, at least one of the refractive surfaces is aspherical. With a view to manufacturing possibilities and tolerances, the two surfaces are preferably aspherical.

The reflector-objective element may be made entirely of glass. The advantage of glass is that it is stable, that is to say, it is substantially not affected by variations in ambient parameters, notably temperature and humidity. However, it may be a cumbersome process to provide aspherical surfaces in glass. It is alternatively possible to manufacture the reflector-objective element from a transparent synthetic material, for example by pressing or moulding. By using moulds having profiles which are the mirror images of the desired aspherical profiles, the aspherical surfaces can be manufactured simply and simultaneously with the lens shape. The appropriate synthetic materials hitherto known are, however, rather sensitive to variations in temperature and humidity.

An optimum compromise from the standpoint of ease of manufacturing and stability, is presented by embodiments which use a glass substrate 15 having a spherical surface and a flat surface, 17 and 14 as in FIG. 2, or having two spherical surfaces, 17 and 18 as in FIG. 3. A layer of a synthetic material, 19 in FIG. 2 and 19 and 20 in FIG. 3, with an aspherical outer profile, 13 in FIG. 2 and 13 and 16 in FIG. 3, is then provided on a spherical surface. The transparent synthetic material layers are very thin so that variations in the refractive index or in the shape of these layers only slightly affect the optical behaviour of the reflector-objective element as a whole.

The substrate of the reflector-objective element preferably has the shape of a hemisphere. This objective element may be manufactured by using a glass sphere which can be obtained in a simple and low-cost manner by known of techniques. For example, square cubes of glass can be used which are spun around in a drum until substantially round spheres are produced. These spheres may subsequently be polished. A sphere thus obtained is then cut in half. Thereafter, the cutting edge is polished and is provided with a reflective coating and possibly a protective coating. A polymerisable material, for example, a material which is cured by ultraviolet radiation, is provided at the desired areas on the reflective hemisphere. Thereafter one or two moulds having aspherical profiles are pressed into it. The material is then exposed, for example through the mould and the mould is removed, thereby obtaining the sphere with one or two aspherical surface portions.

The invention may be used not only in a read apparatus but also in a recording apparatus. In principle the apparatus for recording has the same structure as the read apparatus shown in FIG. 1. The radiation beam which enters the reflector-objective element must then be modulated with the information to be recorded. This can be realised with an optical modulator in the radiation path or by driving the diode laser with a drive signal which is modulated in accordance with the information to be recorded.

What is claimed is:

1. An apparatus for scanning a radiation reflective, planar information surface of a record carrier, said apparatus comprising means for generating a scanning beam of radiation, said scanning beam being directed along a path having a first portion which is generally parallel to the plane of said information surface, and a reflector-objective element disposed in said first portion of said path, said reflector-objective element having a radiation-reflective surface arranged so as to direct radiation of said scanning beam incident thereon along a second path portion which is generally perpendicular to the plane of said information surface and onto said information surface, and to direct radiation of said scanning beam which is reflected by said information surface and passes along said second path portion, towards said first path portion, said reflector-objective element further having a first refractive surface arranged in said first path portion and a second refractive surface arranged in said second path portion, at least one of said first and second refractive surfaces being convex and aspherical such that said reflector-objective element focuses the radiation of said scanning beam coming from said beam generating means and incident on said reflector-objective element, into a scanning spot on said information surface so that said reflector-objective element forms a single, integral unit which focuses said beam to a scanning spot on said information surface and acts as a reflector which directs the radiation coming from said beam generating means and passing along said first path portion towards said second path portion and directs the reflected radiation passing along said second path portion towards the first path portion.

2. The apparatus acccording to claim 1 comprising a collimator lens arranged in the path of said beam between said beam generating means and said reflector-objective element and wherein one of said refractive surfaces of said reflector-objective element is convex and aspherical and the other refractive surface is planar.

3. The apparatus according to claim 2 wherein said planar surface is disposed in said second path portion between said reflective surface and said record carrier.

4. The apparatus according to claim 1 wherein said first and second refractive surfaces are convex.

5. The apparatus according to claim 4 wherein said reflector-objective element has a generally hemispherical shape with a planar surface defining said radiation-reflective surface.

6. The apparatus according to claim 5 wherein a portion of the surface of said reflector-objective element is aspherical and defines said at least one refractive surface.

7. The apparatus according to claim 1 wherein said reflector-objective element comprises a glass substrate and a layer of transparent synthetic material disposed on said substrate, said layer having an aspherical surface and defining said at least one convex and aspherical refractive surface of said reflector-objective element.

8. The apparatus according to claim 7 wherein said synthetic material is a polymer which is cured by ultraviolet radiation.

9. The apparatus according to claim 7 wherein said glass substrate has a generally hemispherical shape with a planar surface defining said radiation-reflective surface.

10. The apparatus according to claim 1 including means, disposed in a portion of the path traversed by incident radiation coming from said beam generating means and by said reflected radiation, for separating at least a portion of said reflected radiation from said incident radiation and a radiation sensitive detector disposed in the path of said reflected radiation which is separated from said incident radiation by said radiation separating means.

* * * * *